(12) United States Patent
Kumthekar et al.

(10) Patent No.: US 9,852,192 B2
(45) Date of Patent: *Dec. 26, 2017

(54) METHODS, SYSTEMS, AND MEDIA FOR RECOMMENDING MEDIA CONTENT

(71) Applicant: Google Inc., Mountain View, CA (US)

(72) Inventors: Aditee Kumthekar, Santa Clara, CA (US); Yu He, Sunnyvale, CA (US); Kevin Patrick Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,684

(22) Filed: Aug. 22, 2016

(65) Prior Publication Data

US 2016/0357759 A1    Dec. 8, 2016

Related U.S. Application Data

(63) Continuation of application No. 14/694,876, filed on Apr. 23, 2016, now Pat. No. 9,424,320, which is a (Continued)

(51) Int. Cl.
*G06F 17/30* (2006.01)
*H04N 21/442* (2011.01)
*H04N 21/482* (2011.01)

(52) U.S. Cl.
CPC .... *G06F 17/3053* (2013.01); *G06F 17/30023* (2013.01); *G06F 17/30823* (2013.01); *G06F 17/30864* (2013.01); *H04N 21/442* (2013.01); *H04N 21/4826* (2013.01); *H04N 21/4828* (2013.01)

(58) Field of Classification Search
None
See application file for complete search history.

(56) References Cited

U.S. PATENT DOCUMENTS 7,752,201 B2 * 7/2010 Anderson ......... G06F 17/30864
707/713
7,842,876 B2 11/2010 Benyamin
(Continued)

OTHER PUBLICATIONS

Office Action dated Mar. 9, 2016 in U.S. Appl. No. 14/694,876.
(Continued)

*Primary Examiner* — Anh Tai Tran
(74) *Attorney, Agent, or Firm* — Byrne Poh LLP

(57) ABSTRACT

Mechanisms are provided that: identify topics associated with a plurality of pieces of media content presented in a session; calculate a distance metric for pairs of topics, wherein each of the pairs of topics includes a first topic associated with a first piece of media content and a second topic associated with a second piece of media content, and wherein the second piece of media content was presented within a given span of the presentation of the first piece of media content; for each first topic of the pairs of topics, generate a rank-ordered list for all corresponding second topics; for each of the plurality of pieces of media content, generate a single rank-ordered list of all second topics; and for each of the plurality of pieces of media content, identify one or more other pieces of media content as recommended media content based on the single rank-ordered list.

21 Claims, 9 Drawing Sheets

Related U.S. Application Data continuation of application No. 13/731,303, filed on Dec. 31, 2012, now Pat. No. 9,031,954.

(56) References Cited

U.S. PATENT DOCUMENTS

| | | |
|---|---|---|
| 8,019,749 B2 * | 9/2011 | Leban ............... G06F 17/30991 707/713 |
| 8,751,489 B2 * | 6/2014 | Ortega ............... G06F 17/30997 707/723 |
| 2005/0222987 A1 * | 10/2005 | Vadon ............... G06F 17/30997 |
| 2010/0070917 A1 | 3/2010 | Gates et al. |
| 2010/0169331 A1 * | 7/2010 | Karidi ............... G06F 17/30864 707/754 |
| 2011/0040767 A1 * | 2/2011 | Kunjithapatham G06F 17/30734 707/749 |
| 2011/0060649 A1 | 3/2011 | Dunk et al. |
| 2011/0295846 A1 | 12/2011 | Priyadarshan et al. |

OTHER PUBLICATIONS

Office Action dated Sep. 25, 2014 in U.S. Appl. No. 13/731,303.
Notice of Allowance dated Jan. 13, 2015 in U.S. Appl. No. 13/731,303.
Notice of Allowance dated Apr. 22, 2016 in U.S. Appl. No. 14/694,876.

* cited by examiner

METHODS, SYSTEMS, AND MEDIA FOR RECOMMENDING MEDIA CONTENT

CROSS-REFERENCE TO RELATED APPLICATIONS

This application is a continuation of U.S. patent application Ser. No. 14/694,876, filed Apr. 23, 2015, which is a continuation of U.S. patent application Ser. No. 13/731,303, filed Dec. 31, 2012, which is hereby incorporated by reference herein in its entirety.

BACKGROUND

With the explosive growth of the Internet, high-speed communications, and digital recording technology, there has been a continued growth in the availability of online media content (such as videos, audio, images, graphics, text, etc.) and the number of instances of users accessing such online media content. For example, video sharing Web sites are incredibly popular and users can use such Web sites to be presented with videos on almost any conceivable subject.

In many instances, the volume of media content available to a user is overwhelming. To address this issue, some video sharing Web sites have the ability to make recommendations of media content to users. For example, many video sharing Web sites will make recommendations of "viral" (i.e., extremely popular) media content. As another example, many video sharing Web sites will make recommendations of recently added media content.

Unfortunately, existing mechanisms for recommending media content leave much to be desired when it comes to accurately predicting the type of media content that a user may want to be presented with.

Accordingly, new mechanisms for recommending media content are desirable.

SUMMARY

Systems, methods, and media for recommending media content are provided. In some embodiments, systems for recommending media content are provided, the systems comprising: at least one hardware processor configured to: identify topics associated with a plurality of pieces of media content presented in a session; calculate a distance metric for pairs of topics, wherein each of the pairs of topics includes a first topic associated with a first piece of media content and a second topic associated with a second piece of media content, and wherein the second piece of media content was presented within a given span of the presentation of the first piece of media content; for each first topic of the pairs of topics, generate a rank-ordered list for all corresponding second topics; for each of the plurality of pieces of media content, generate a single rank-ordered list of all second topics; and for each of the plurality of pieces of media content, identify one or more other pieces of media content as recommended media content based on the single rank-ordered list.

In some embodiments, methods for recommending media content are provided, the methods comprising: identifying, using a hardware processor, topics associated with a plurality of pieces of media content presented in a session; calculating, using the hardware processor, a distance metric for pairs of topics, wherein each of the pairs of topics includes a first topic associated with a first piece of media content and a second topic associated with a second piece of media content, and wherein the second piece of media content was presented within a given span of the presentation of the first piece of media content; for each first topic of the pairs of topics, generating, using the hardware processor, a rank-ordered list for all corresponding second topics; for each of the plurality of pieces of media content, generating, using the hardware processor, a single rank-ordered list of all second topics; and for each of the plurality of pieces of media content, identifying, using the hardware processor, one or more other pieces of media content as recommended media content based on the single rank-ordered list.

In some embodiments, a computer-readable medium containing computer-executable instructions that, when executed by a processor, cause the processor to perform a method for recommending media content are provided, is provided. The method comprises: identifying topics associated with a plurality of pieces of media content presented in a session; calculating a distance metric for pairs of topics, wherein each of the pairs of topics includes a first topic associated with a first piece of media content and a second topic associated with a second piece of media content, and wherein the second piece of media content was presented within a given span of the presentation of the first piece of media content; for each first topic of the pairs of topics, generating a rank-ordered list for all corresponding second topics; for each of the plurality of pieces of media content, generating a single rank-ordered list of all second topics; and for each of the plurality of pieces of media content, identifying one or more other pieces of media content as recommended media content based on the single rank-ordered list.

DETAILED DESCRIPTION

Systems, methods, and media for recommending media content are provided.

In accordance with some embodiments, mechanisms are provided for recommending media content, such as a video, audio, an image, graphics, text, etc., that are related to a piece of media content selected by a user. These recommendations can be based on the media content selected by the user and/or other users during media content presentation sessions determined as being "good." In some embodiments, a media content presentation session can be determined as being good when a user is presented with at least a given number of pieces of media content, and each piece of media content is presented for a least a given period time.

Figure 1:
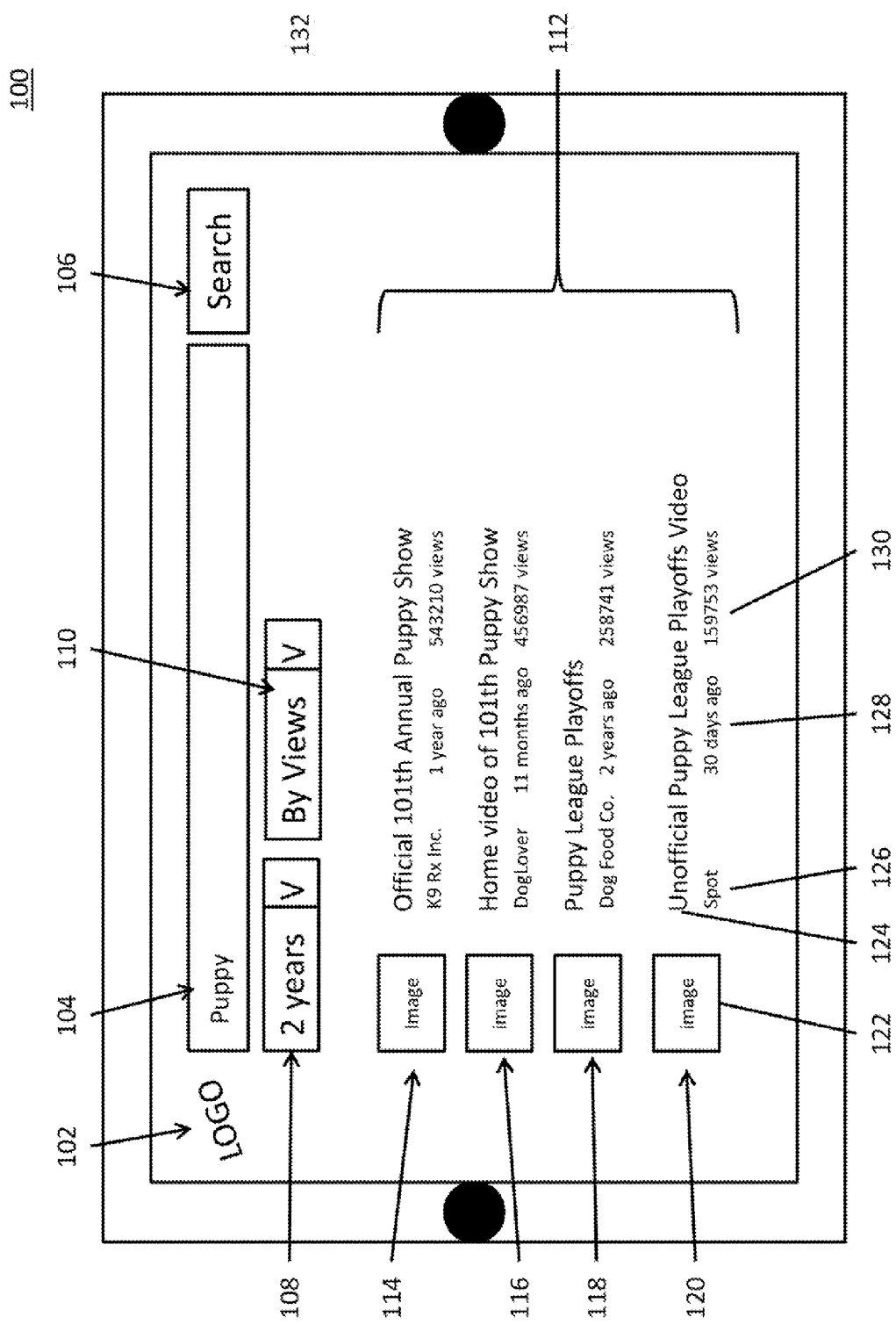
FIG. 1 is an example of a user interface for a media content search mechanism in accordance with some embodiments.

Turning to FIG. 1, an example 100 of a user interface for searching for and accessing media content on a user device in accordance with some embodiments is illustrated. As shown, in some embodiments, user interface 100 can include a provider logo 102, a search term entry field 104, a search button 106, a filter option 108, a sort option 110, and search results 112.

Logo 102 can be any suitable logo of any suitable provider of user interface 100 and can include any suitable text, graphics, images, video, etc. in accordance with some embodiments.

Search term entry field 104 can be any suitable field for entering search terms for a media content search in accordance with some embodiments. For example, as shown, field 104 can be a text entry box for receiving typed text. As another example, field 104 can be a window for entering hand-written text. Search button 106 can be any suitable mechanism for receiving an indication from a user that a search can be performed in accordance with some embodiments. In some embodiments, search button 106 can be omitted and a search can be performed for each character or word entered in field 104 or can be performed after a suitable period of time after a user has entered a search term in field 104.

Filter option 108 can be any suitable mechanism, such as a drop down menu, for receiving a user's selection of any suitable one or more filters to be applied to search results in accordance with some embodiments. For example, as shown, filter option 108 can be used to limit search results to content posted in a given period of time (e.g., the past two years). In some embodiments, filter option 108 can be omitted.

Sort option 110 can be any suitable mechanism, such as a drop down menu, for receiving a user's selection of any suitable one or more sort controls to be applied to search results in accordance with some embodiments. For example, as shown, sort option 110 can be used to sort search results by the number of views associated with the results. In some embodiments, sort option 110 can be omitted.

Search results 112 can be any suitable search results, such as such results 114, 116, 118, and 120, for any suitable media content in accordance with some embodiments. The search results can include any suitable information and that information can be presented in any suitable manner. For example, in some embodiments, information can be presented using text, graphics, images, video, sounds, audio, etc. As another, more-particular example, this information can include a thumbnail image 122, a title in text format 124, a name of the source of the content in text format 124, an age of the content in text format 128, and a count of the number of views of the content in text format 130.

One or more of search results 112 can be selected by a user in order to request a presentation of the selected media content. The user can select one or more of the search results in any suitable manner. For example, the user can select a search result by touching a search result presented on a touch-screen display. As another example, the user can select a search result by highlighting a search result and pressing an enter button or a play button.

Figure 2:
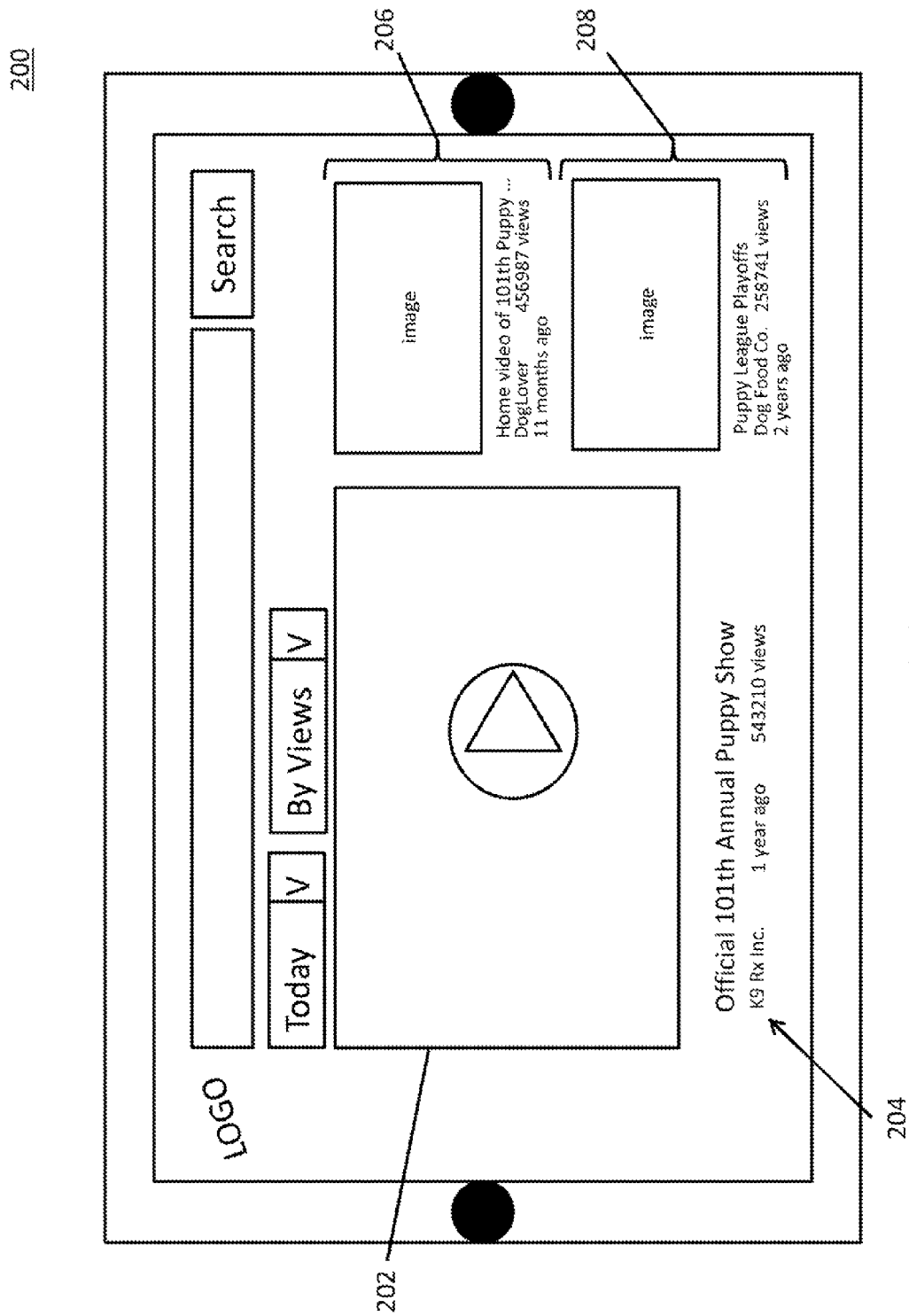
FIG. 2 is an example of a user interface for presenting media content and showing recommended content in accordance with some embodiments.

FIG. 2 shows an example 200 of a user interface for presenting a piece of media content to a user and for allowing the user to view and select recommendations of media content for presentation in accordance with some embodiments. User interface 200 may be presented in response to a user selecting a search result in a search interface, such as interface 100 of FIG. 1. As illustrated, in user interface 200, a piece of media content can be presented in some embodiments in presentation window 202. Information about the piece of media content can be presented in region 204. Information for recommended media content can be presented in regions 206 and 208. Any suitable information can be presented. For example, the information can include an image of the recommended media content, a title of the recommended media content, a source of the recommended media content, an age of the recommended media content, and/or any other suitable information. The recommended media content can be selected in any suitable manner. For example, the recommended media content can be selected in a manner similar to how search results 112 can be selected as described herein.

Figure 3:
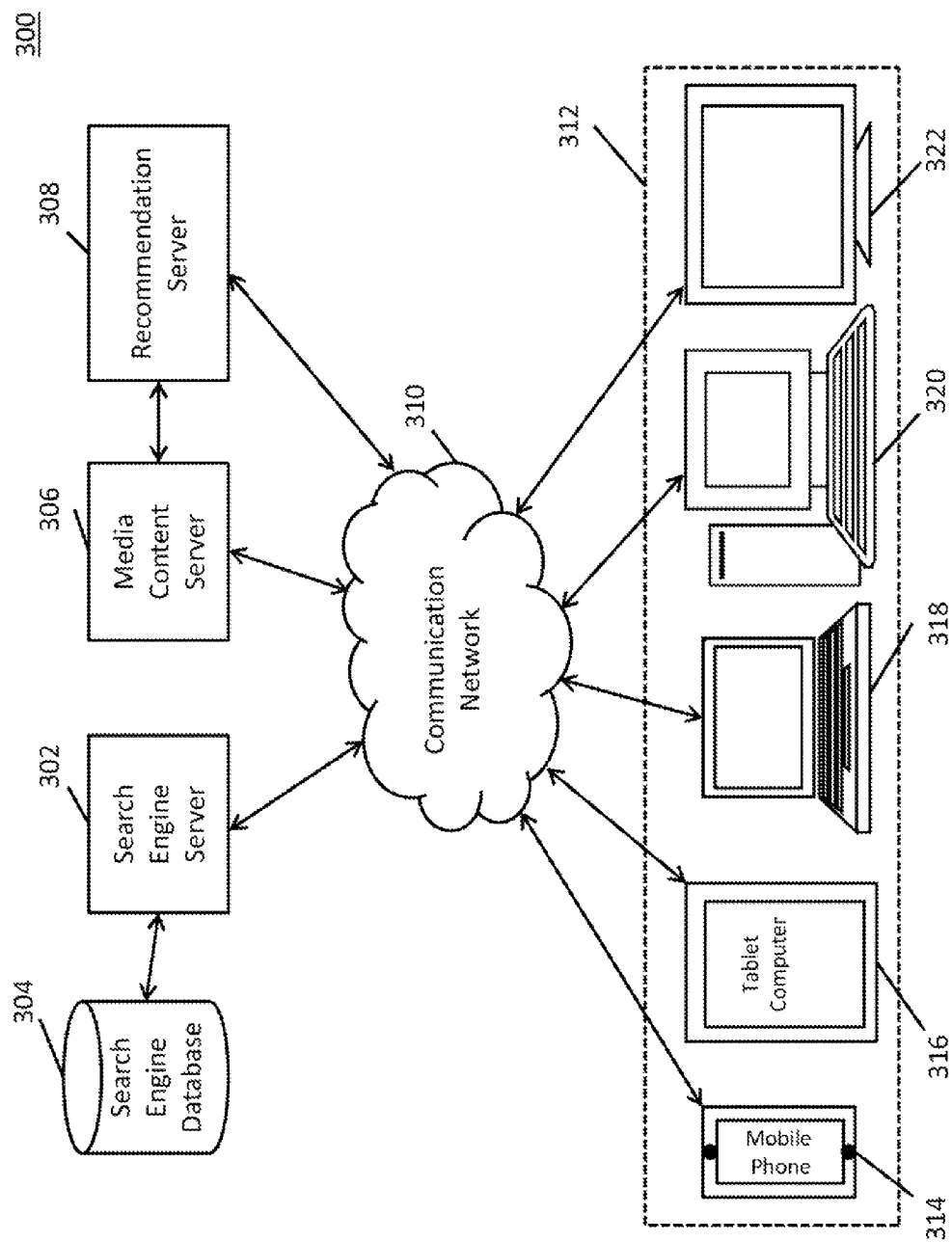
FIG. 3 is an example of hardware that can be used in accordance with some embodiments.

Turning to FIG. 3, an example 300 of hardware that can be used in accordance with some embodiments is shown. As illustrated, hardware 300 can include a search engine server 302, a search engine database 304, a media content server 306, a recommendation server 308, a communication network 310, and one or more user devices 312, such as a mobile phone 314, a tablet computer 316, a laptop computer 318, a desktop computer 320, a television 322, and/or any other suitable equipment.

Search engine server 302 can be any suitable search engine server in accordance with some embodiments. For example, search engine server 302 can be a search engine that receives search requests sent from a Web browser and returns search results in a Web page. As another example, search engine server 302 can be a search engine that receives search requests from a dedicated media presentation application and returns search results in a format specifically tailored for that application.

In some embodiments, search engine server 302 can control the manner in which the search results are presented to a user. For example, server 302 can control how the search results are presented as described above in connection with FIG. 1.

Search engine database 304 can be any suitable search engine database for storing data relating to media content available for presentation in some embodiments. For example, this data can include the title of content, the source of content, the number of views of content, a thumbnail associated with content, and/or any other suitable information.

Media content server 306 can be any suitable media content server for storing media content and for delivering the content to a user device 312 of a user in some embodiments. For example, media content server 306 can be a server that streams media content to a user device 312 via communication network 310. Media content provided by media content server 306 can be any suitable content such as video content, audio content, television programs, movies, cartoons, music, sound effects, audio-books, streaming live content (e.g., a streaming radio show, a live concert, a live political event, etc.), pre-recorded content, etc.

Recommendation server 308 can be any suitable server for identifying media content that is related to specified media content in some embodiments. Recommendation server can identify related media content as described herein in some embodiments.

Communication network 310 can be any suitable combination of one or more wired and/or wireless networks in some embodiments. For example, communication network 310 can include any one or more of the Internet, a mobile data network, a satellite network, a local area network, a wide area network, a telephone network, a cable television network, a WiFi network, a WiMax network, and/or any other suitable communication network.

User devices 312 can include any suitable user devices for generating search requests for media content, for presenting search results to a user as described herein, for presenting media content, and for presenting recommendations of content to a user as described herein, in some embodiments. For example, in some embodiments, user devices 312 can include mobile devices, such as mobile phone 314, tablet computer 316, laptop computer 318, a vehicle (e.g., car, boat, airplane, etc.) entertainment system, a portable media player, etc. As another example, in some embodiments, user devices 312 can include non-mobile devices, such as a desktop computer 320, a set-top box, a smart television 322, a streaming media player, a game console, etc.

Although search engine server 302, search engine database 304, media content server 306, and recommendation server 308 are illustrated as separate devices, any of these devices can be combined into any one or more devices in some embodiments. Also, although only one of each of search engine server 302, search engine database 304, media content server 306, and recommendation server 308 is shown in FIG. 3 to avoid over-complicating the figure, any suitable one or more of these devices can be used in some embodiments.

Although five user devices 314, 316, 318, 320, and 322 are shown in FIG. 3 to avoid over-complicating the drawing, any suitable number of these devices, and any suitable types of these devices, can be used in some embodiments.

Figure 4:
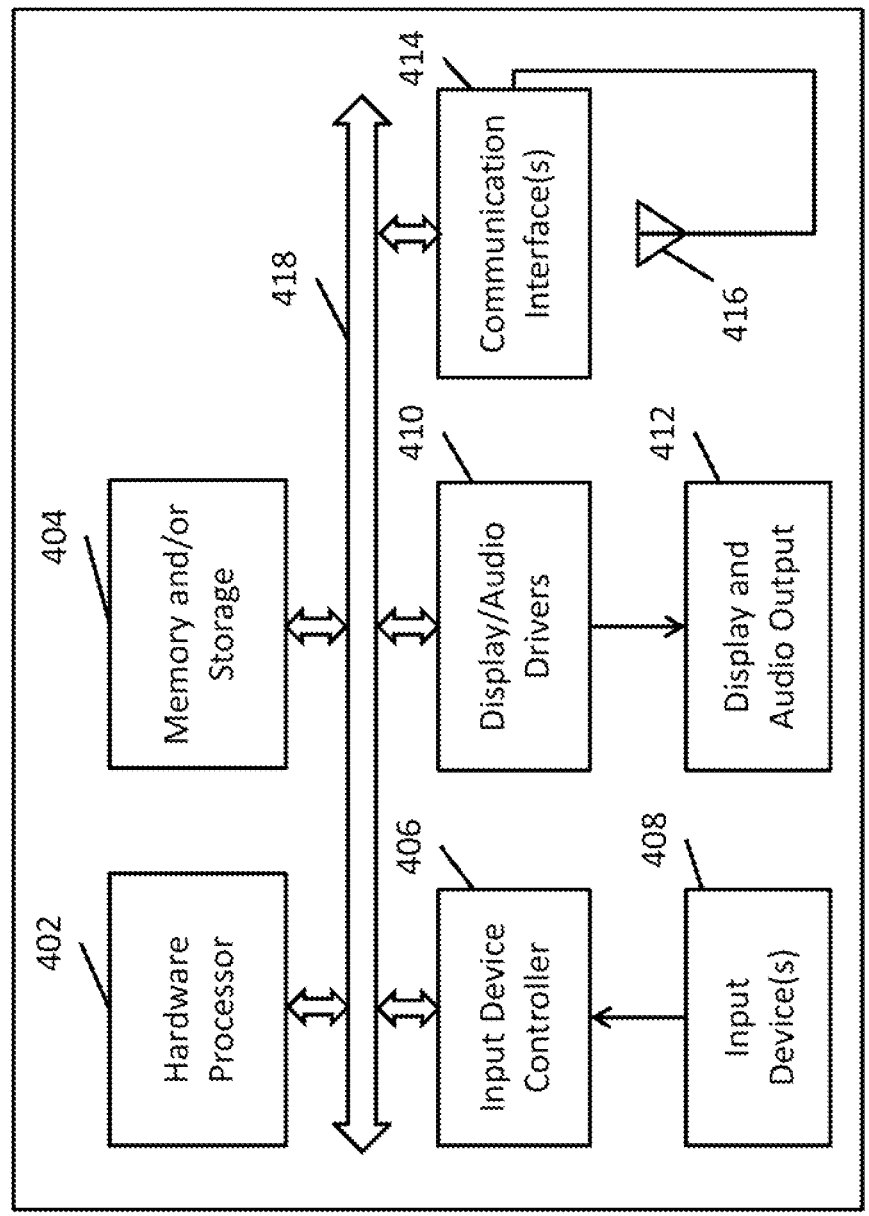
FIG. 4 is an example of hardware that can be used in a database, a server, and/or a user device in accordance with some embodiments.

Search engine server 302, search engine database 304, media content server 306, recommendation server 308, and user devices 312 can be implemented using any suitable hardware in some embodiments. For example, in some embodiments, devices 302, 304, 306, 308, and/or 312 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include a hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 404 can be any suitable memory and/or storage for storing programs, data, media content, etc. in some embodiments. For example, memory and/or storage 404 can include random access memory, read only memory, flash memory, hard disk storage, optical media, etc.

Input device controller 406 can be any suitable circuitry for controlling and receiving input from one or more input devices 408 in some embodiments. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, etc.

Display/audio drivers 410 can be any suitable circuitry for controlling and driving output to one or more display and audio output circuitries 412 in some embodiments. For example, display/audio drivers 410 can be circuitry for driving an LCD display, a speaker, an LED, etc.

Communication interface(s) 414 can be any suitable circuitry for interfacing with one or more communication networks, such as networks 310 in some embodiments. For example, interface(s) 414 can include network interface card circuitry, wireless communication circuitry, etc.

Antenna 416 can be any suitable one or more antennas for wirelessly communicating with a communication network in some embodiments. In some embodiments, antenna 416 can be omitted when not needed.

Bus 418 can be any suitable mechanism for communicating between two or more of components 402, 404, 406, 410, and 414 in some embodiments.

Any other suitable components can be included in hardware 400 in accordance with some embodiments.

Turing to FIGS. 5-8, examples 500, 600, 700, and 800 of processes that can be performed in a user device 312, a search engine server 302, a media content server 306, and a recommendation server 308, respectively, in accordance with some embodiments are shown.

Figure 5:
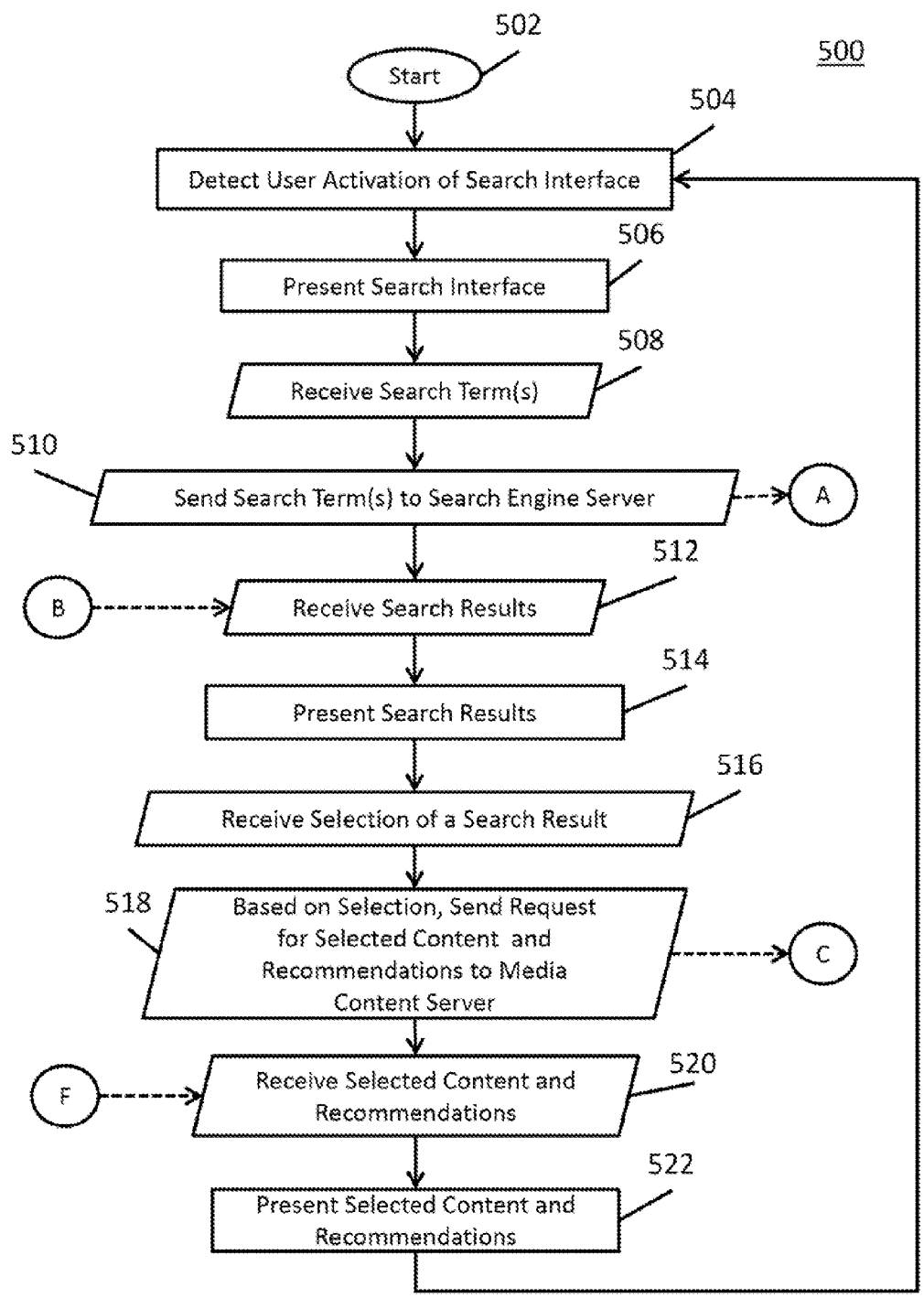
FIG. 5 is an example of a process for a user device in accordance with some embodiments.

More particularly, process 500 of FIG. 5 is an example of a process for requesting a search, receiving and presenting search results, and selecting and presenting media content and recommendations in accordance with some embodiments. Such a process can be performed in a user device 312 in some embodiments. As illustrated, after process 500 has begun at 502, the process can detect a user activation of a search interface at 504. This activation can be detected in response to a user browsing to a search engine Web page, in response to a user selecting a search widget on a user device, in response to a user activating a media player, etc.

Next, at 506, process 500 can present a search interface. Any suitable search interface can be presented. For example, in some embodiments, a search interface such as that described in FIG. 1 can be presented in some embodiments.

At 508, the process can next receive the search terms. These search terms can be received in response to a user typing the terms, in response to a user speaking the terms, in response to the user selecting the terms from a menu, based on previously selected content, in response to the user pasting the terms, etc.

Then, at 510, process 500 can send the search terms to a search engine. These search terms can be sent in any suitable manner in some embodiments. For example, in some embodiments, these terms can be sent in any suitable protocol using any suitable type of communication interface.

Process 500 can then receive search results at 512. Any suitable search results, in any suitable format, can be received in some embodiments. For example, search results as described above in connection with FIG. 1 can be received in some embodiments. These search results can be received in any suitable manner in some embodiments. For example, in some embodiments, these search results can be received in any suitable protocol using any suitable type of communication interface.

At 514, process 500 can then present the search results. This presentation can be performed in any suitable manner. For example, in some embodiments, this presentation can be performed as described above in connection with FIG. 1.

Next, at 516, process 500 can receive a selection of one or more of the search results in any suitable manner. For example, process 500 can receive a selection of a search result in response to a user touching a search result presented on a touch-screen display. As another example, process 500 can receive a selection of a search result in response to a user highlighting a search result and pressing an enter button or a play button.

At 518, the process can then send a request for the selected media content and recommendations of other media content to a media content server. This request can be sent in any suitable manner in some embodiments. For example, in some embodiments, this request can be sent in any suitable protocol using any suitable type of communication interface.

At 520, process 500 can receive media content and recommendation information in response to the request sent at 518. This selected media content and/or recommendation information can be received in any suitable manner in some embodiments. For example, in some embodiments, this media content and/or recommendation information can be received in any suitable protocol using any suitable type of communication interface.

Next, at 522, the media content and recommendation information can be presented in any suitable manner. For example, the media content and recommendation information can be presented as illustrated in, and described in connection with, FIG. 2.

After the media content and recommendation information has been presented, process 500 can loop back to 504 to wait for the next user activation.

Figure 6:
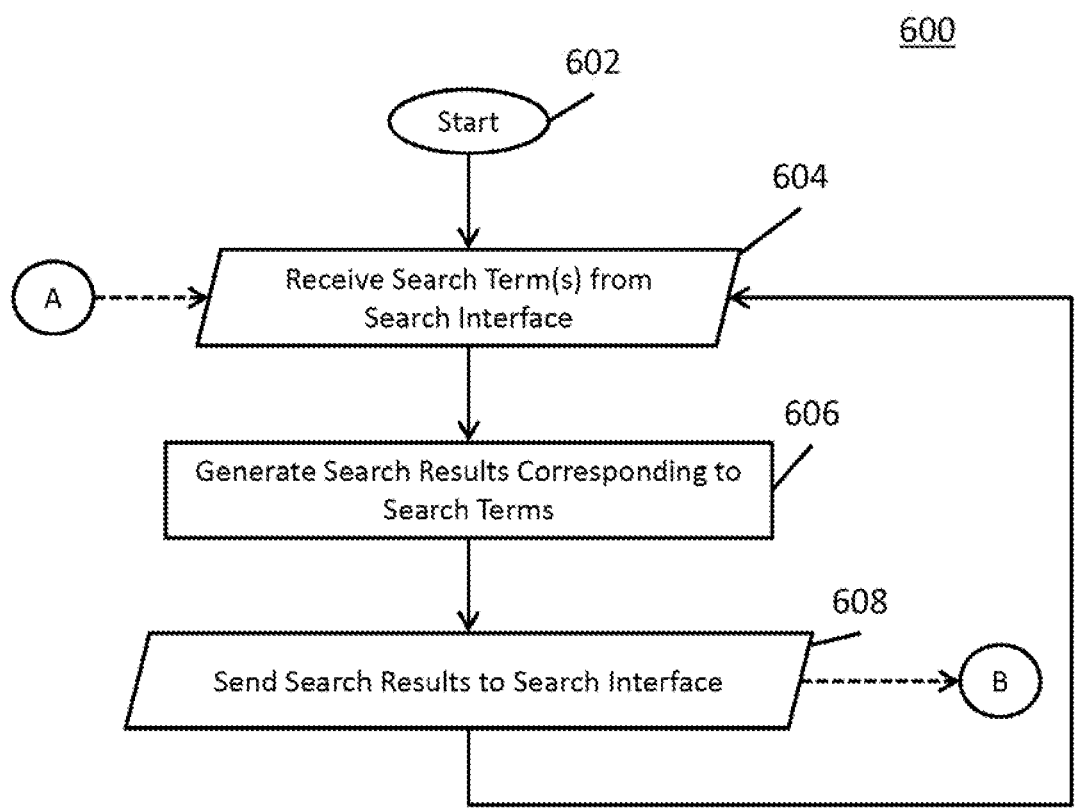
FIG. 6 is an example of a process for a search engine server in accordance with some embodiments.

Process 600 of FIG. 6 is an example of a process for receiving and responding to a search request in accordance with some embodiments. Such a process can be performed in a search engine server 302 in some embodiments. As illustrated, after process 600 has begun at 602, the process can receive search terms from a search interface (such as interface 100 of FIG. 1) at 604 in some embodiments. These search terms can be received in any suitable manner in some embodiments. For example, in some embodiments, these terms can be received in any suitable protocol using any suitable type of communication interface.

Next, at 606, process 600 can generate search results corresponding to the search terms in some embodiments. These search results can be generated in any suitable manner in some embodiments. For example, in some embodiments, the search results can be generated based on data received from search engine database 304 in response to a database query.

Then, process 600 can then send the search results to the search interface at 608 and loop back to 604. These search results can be sent in any suitable manner in some embodiments. For example, in some embodiments, these search results can be sent in any suitable protocol using any suitable type of communication interface.

Figure 7:
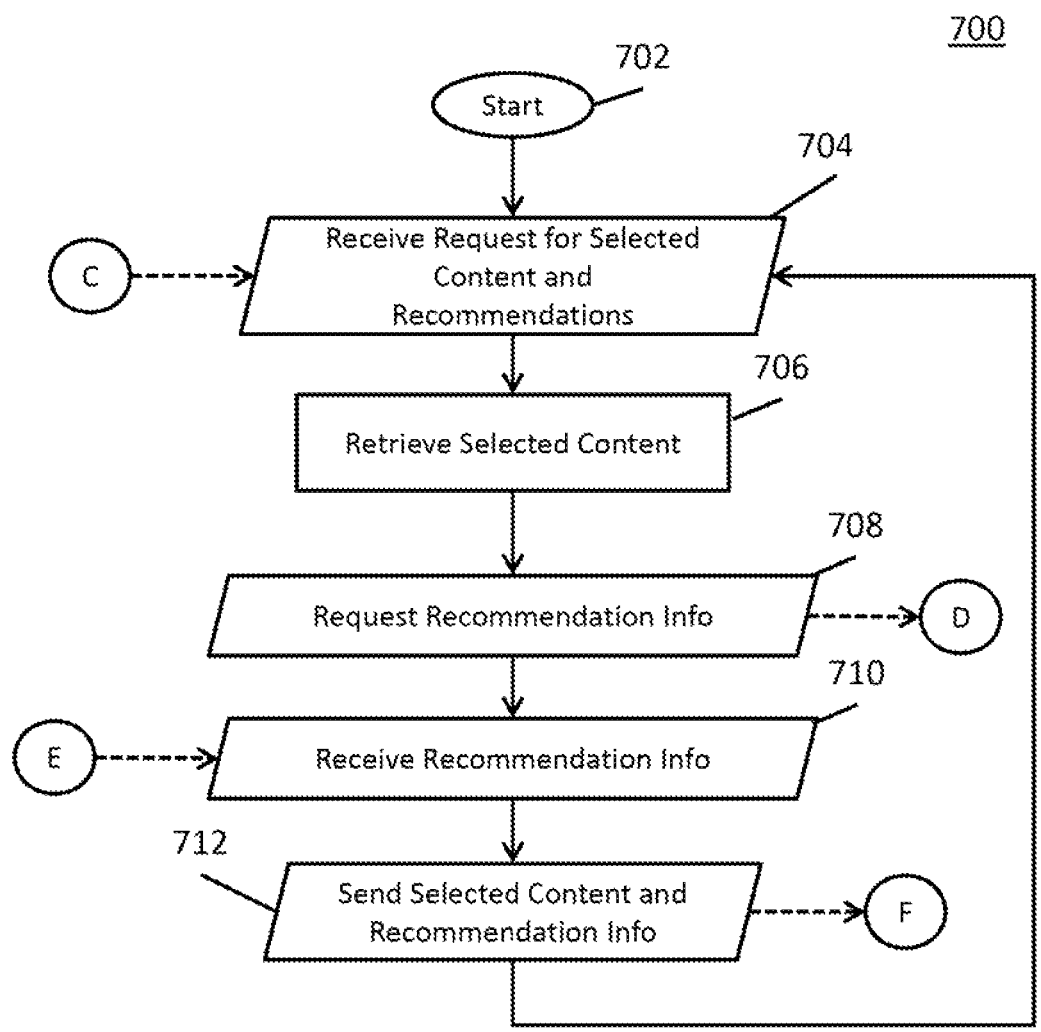
FIG. 7 is an example of a process for a media content server in accordance with some embodiments.

Process 700 of FIG. 7 is an example of a process for receiving and responding to a request for media content and recommendations in accordance with some embodiments. Such a process can be performed in a media content server 306 in some embodiments. As illustrated, after process 700 has begun at 702, the process can receive a request for selected content and recommendations from a search interface, such as search interface 100 of FIG. 1, at 704. This request can be received in any suitable manner in some embodiments. For example, in some embodiments, this request can be received in any suitable protocol using any suitable type of communication interface.

Next, at 706, the process can retrieve the requested content. This content can be retrieved in any suitable manner. For example, in some embodiments, this content can be retrieved by requesting and receiving from storage in server 306 a full copy of the content. As another example, in some embodiments, this content can be retrieved by requesting and receiving a link or a pointer that can be used to access a full copy of the content.

Process 700 can then request recommendation information at 708. This request can be sent in any suitable manner in some embodiments. For example, in some embodiments, this request can be sent in any suitable protocol using any suitable type of communication interface.

At 710, process 700 can receive recommendation information in response to the request sent at 708. This recommendation information can be received in any suitable manner in some embodiments. For example, in some embodiments, this recommendation information can be received in any suitable protocol using any suitable type of communication interface. Any suitable information can be received in some embodiments. For example, in some embodiments, the information can include an image of recommended media content, a title of the recommended media content, a source of the recommended media content, an age of the recommended media content, a link to the recommended media content, an identifier of the recommended media content, and/or any other suitable information.

Process 700 can then send the retrieved content and the recommendation information to the user device at 712 and loop back to 704. This media content and recommendation information can be sent in any suitable manner in some embodiments. For example, in some embodiments, this media content and recommendation information can be sent in any suitable protocol using any suitable type of communication interface.

Figure 8:
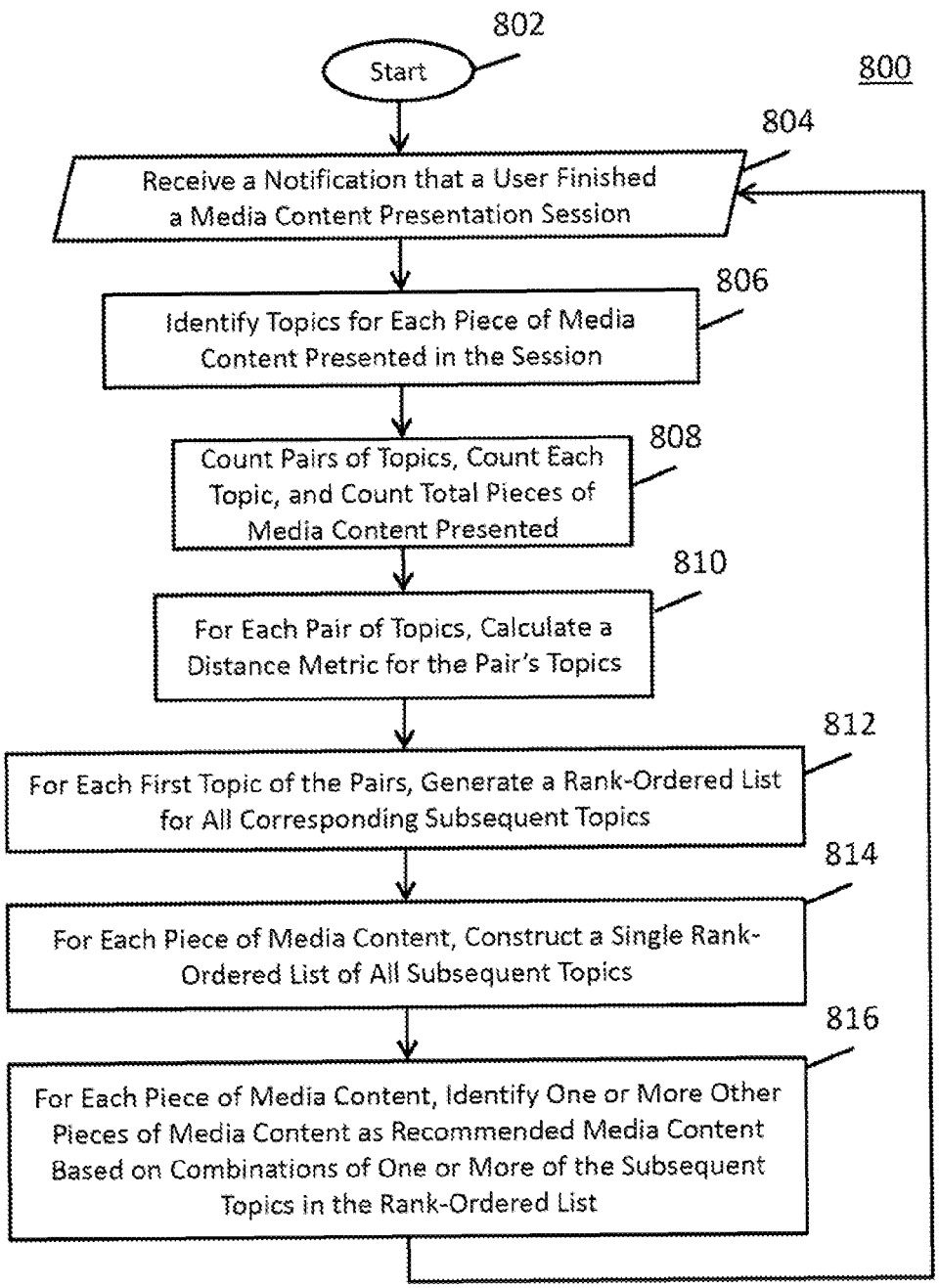
FIG. 8 is an example of a process for generating recommendation information that can be used in a recommendation server in accordance with some embodiments.

Turning to FIG. 8, an example 800 of a process that can be used to identify related media content to selected media content so that the related media content can be used for recommendations in accordance with some embodiments is illustrated.

As shown in FIG. 8, after process 800 begins at 802, at 804, the process can receive a notification that a user has finished a media content presentation session in some embodiments. For example, in some embodiments, this notification can be generated when a user has completed being presented with at least a given number pieces of media content and each of these pieces of media content was presented for at least a given period of time. This notification can be received in any suitable manner. For example, in some embodiments, this notification can be received using any suitable protocol and any suitable communication interface.

Next, at 806, process 800 can identify one or more topics for each piece of media content presented in the session. A topic can be any suitable characteristic or feature of a piece of media content in some embodiments. For example, a topic can be an artist name, a song name, a product name, a user-assigned tag, a Freebase entity, and/or any other characteristic or feature.

At 808, the process can next count pairs of topics spanning a given number of presentations in the session. Any suitable span, such as two presentations (i.e., two presentations adjacent in time), three presentations, four presentations, etc., can be used in some embodiments. For example, when using a span of two presentations, if a user is presented with Video A, having topics 1, 2, and 3, and Video B, having topics 3, 4, and 5, the counters for the following pairs would be incremented: 1-3; 1-4; 1-5; 2-3; 2-4; 2-5; 3-3; 3-4; and 3-5. As another example, when using a span of three presentations, if a user is presented with Video A, having topics 1 and 2, Video B, having topics 3 and 4, and Video C, having topics 5 and 6, the counters for the following pairs would be incremented: 1-3; 1-4; 1-5; 1-6; 2-3; 2-4; 2-5; 2-6; 3-5; 3-6; 4-5; and 4-6.

At 808, the process can also increment a count for each topic encountered during a presentation in some embodiments. For example, if a user is presented with Video A, having topics 1, 2, and 3, and Video B, having topics 3, 4, and 5, the counters for topics 1, 2, 4, and 5 would each be incremented once and the counter for topic 3 would be incremented twice.

At 808, the process can also increment a count of the total number of pieces of media content presented in some embodiments. For example, if a user is presented with Video A and Video B, the counter for the total number of piece of media content presented would be incremented twice.

Next, at 810, for each pair of topics, process 800 can calculate a distance metric for the topics in the pair. Any suitable distance metric can be calculated in some embodiments. For example, in some embodiments, a mutual information score can be calculated as a distance metric. More particularly, for example, for pair 1-3 in a scenario spanning two presentations, the process can calculate a mutual information score for topic 3 corresponding to a presentation that follows a presentation corresponding to topic 1. In such a case, topic 3 would be a subsequent topic of topic 1.

A mutual information score can be calculated in any suitable manner. For example, in some embodiments, the score can be calculated as:

$$MI(FT, ST) = \frac{\log((Count_{FT,ST} + Count_{Total})/(Count_{FT} + Count_{ST}))}{\log(2)},$$

where FT is the first topic in a pair, ST is the second topic in the pair, $Count_{FT,ST}$ is the count of the media content pairs presented where the first piece of media content has the first topic and the second piece of media content has the second topic, $Count_{Total}$ is the count of all pieces of media content presented, $Count_{FT}$ is the count of the pieces of media content presented with the first topic, and $Count_{ST}$ is the count of the pieces of media content presented with the second topic.

Then, at 812, for each first topic of the pairs, process 800 can generate a rank-ordered list for all corresponding subsequent topics in some embodiments. For example, for the pairs 1-3, 1-4, and 1-5, a rank-ordered list can be generated for topic 1 wherein the list identifies, and ranks by, the distance metric (e.g., the mutual information score) for topic 3, topic 4, and topic 5 being associated with a presentation that follows a presentation associated with topic 1.

For each piece of media content, process 800 can next construct a single rank-ordered list of all subsequent topics at 814 in some embodiments. This list can be formed in any suitable manner.

For example, in some embodiments, this list can be formed by (a) determining the topics associated with the piece of media content, (b) for each of these topics, obtaining the corresponding rank-ordered list formed at 812, and (c) combining all of the rank-ordered lists together to form the single rank-ordered list of all subsequent topics, wherein the distance metric is used a ranking score for the single rank-ordered list.

As another example, in some embodiments, this list can be formed by (a) determining all possible subsequent topics for the piece of media content, (b) for each of these possible subsequent topics (which can each be referred to as "c"), (i) for each of the topics associated with the piece of media content (which topics can each be referred to as "k1"), determine the probability that a presentation with topic c will follow a presentation with topic k1, and then multiply these probabilities together to form a value X, (ii) for each of the topics associated with the piece of media content (which topics can each be referred to as "k2"), determine the probability that a presentation with topic c will not follow a presentation with topic k2, and then multiply these probabilities together to form a value Y, (iii) calculate Z=X/(X+Y), and (iv) assign the value of Z to the particular value c, and (c) form a rank-ordered list of the different values of c, wherein the values of c are ranked using the corresponding values of Z as a ranking score.

Then, at 816, process 800 can, for each piece of media content, identify one or more other pieces of media content as recommended media content based on combinations of one or more of the subsequent topics in the rank-ordered list formed at 814 in some embodiments. This identification can be performed in any suitable manner. For example, in some embodiments, this identification can be performed by (a) for each other piece of media content, (i) identifying all topics associated with that other piece of media content, (ii) averaging the ranking scores for the identified topics for the other piece of media content, and (iii) assigning the average as a recommendation score for the other piece of media content, and (b) selecting N other pieces of media content with the top recommendation scores as the recommended media content for the piece of media content.

Once the recommended media content for each piece of media content has been identified, process 800 can loop back to 804.

Figure 9:
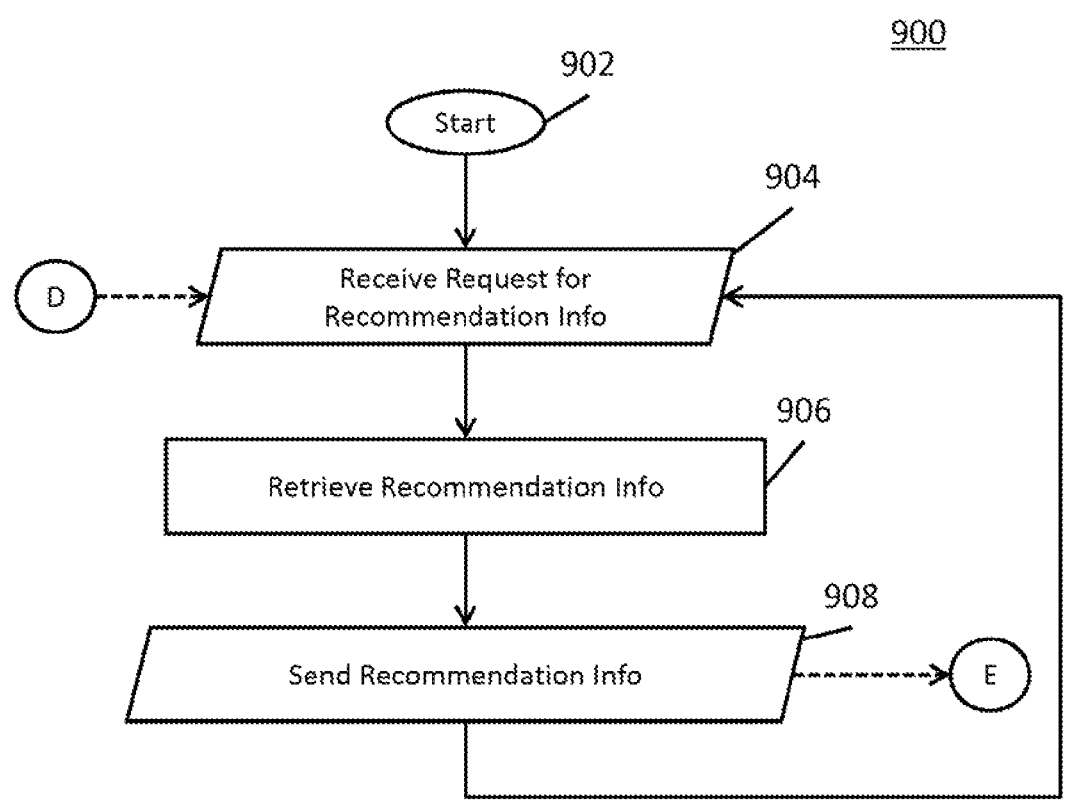
FIG. 9 is an example of a process for providing recommendation information that can be used in a recommendation server in accordance with some embodiments.

Process 900 of FIG. 9 is an example of a process for receiving and responding to a request for recommendation information in accordance with some embodiments. Such a process can be performed in a recommendation server 308 in some embodiments. As illustrated, after process 900 has begun at 902, the process can receive request for recommendation information at 904 in some embodiments. This request can be received in any suitable manner in some embodiments. For example, in some embodiments, the request can be received in any suitable protocol using any suitable type of communication interface.

Next, at 906, process 900 can retrieve recommendation information in some embodiments. This recommendation information can be retrieved in any suitable manner in some embodiments. For example, in some embodiments, the recommendation information can be retrieved from memory or from storage associated with recommendation server 308.

Then, process 900 can send the recommendation information to the search interface at 908 and loop back to 904. This recommendation information can be sent in any suitable manner in some embodiments. For example, in some embodiments, this recommendation information can be sent in any suitable protocol using any suitable type of communication interface.

It should be understood that at least some of the above described steps of the processes of FIGS. 5-9 can be executed or performed in any order or sequence not limited to the order and sequence shown and described in the figures. Also, some of the above steps of the processes of FIGS. 5-9 can be executed or performed substantially simultaneously where appropriate or in parallel to reduce latency and processing times.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for recommending media content, the system comprising:
   at least one hardware processor configured to:
      determine that a session including presentation of at least a first media content item and a second media content item is likely to have ended, wherein the second media content item is presented within a given span of the presentation of the first media content item;
      in response to determining that the session is likely to have ended, determine a first plurality of topics associated with the first media content item and the second media content item;
      determine a second plurality of topics associated with the media content presentation session based on distance information for pairs of topics in the first plurality of topics, wherein each of the pairs of topics includes a first topic associated with the first media content item and a second topic associated with the second media content item; and
      transmit an indication of a plurality of media content items that correspond to at least a portion of the second plurality of topics.

2. The system of claim 1, wherein the at least one hardware processor is further configured to select the first media content item and the second media content item from media content search results that are responsive to search terms.

3. The system of claim 1, wherein the distance information is a mutual information score.

4. The system of claim 1, wherein the given span is two adjacent presentations.

5. The system of claim 1, wherein the at least one hardware processor is further configured to, for each of the first media content item and the second media content item, generate a single rank-ordered list of the second plurality of topics.

6. The system of claim 5, wherein the at least one hardware processor is further configured to, for each of the first media content item and the second media content item, identify the plurality of media content items as recommended media content items based on the single rank-ordered list.

7. The system of claim 6, wherein the single rank-ordered list of the second plurality of topics generated for the first media content item and the second media content item is generated by:
   (a) determining topics associated with the first media content item and the second media content item;
   (b) for each of the topics, obtaining a rank-ordered list of second topics generated for the topic as the first topic; and
   (c) combining all of the rank-ordered lists obtained at (b) together using the distance information as ranking score to form the single rank-ordered list.

8. A method for recommending media content, comprising:
   determining, using a hardware processor, that a session including presentation of at least a first media content item and a second media content item is likely to have ended, wherein the second media content item is presented within a given span of the presentation of the first media content item;
   in response to determining that the session is likely to have ended, determining, using the hardware processor, a first plurality of topics associated with the first media content item and the second media content item;
   determining, using the hardware processor, a second plurality of topics associated with the media content presentation session based on distance information for pairs of topics in the first plurality of topics, wherein each of the pairs of topics includes a first topic associated with the first media content item and a second topic associated with the second media content item; and
   transmitting, using the hardware processor, an indication of a plurality of media content items that correspond to at least a portion of the second plurality of topics.

9. The method of claim 8, further comprising selecting the first media content item and the second media content item from media content search results that are responsive to search terms.

10. The method of claim 8, wherein the distance information is a mutual information score.

11. The method of claim 8, wherein the given span is two adjacent presentations.

12. The method of claim 8, further comprising, for each of the first media content item and the second media content item, generating a single rank-ordered list of the second plurality of topics.

13. The method of claim 12, further comprising, for each of the first media content item and the second media content item, identifying the plurality of media content items as recommended media content items based on the single rank-ordered list.

14. The method of claim 13, wherein the single rank-ordered list of the second plurality of topics generated for the first media content item and the second media content item is generated by:
   (a) determining topics associated with the first media content item and the second media content item;
   (b) for each of the topics, obtaining a rank-ordered list of second topics generated for the topic as the first topic; and
   (c) combining all of the rank-ordered lists obtained at (b) together using the distance information as ranking score to form the single rank-ordered list.

15. A non-transitory computer-readable medium containing computer-executable instructions that, when executed by a processor, cause the processor to perform a method for recommending media content, the method comprising:
- determining that a session including presentation of at least a first media content item and a second media content item is likely to have ended, wherein the second media content item is presented within a given span of the presentation of the first media content item;
- in response to determining that the session is likely to have ended, determining a first plurality of topics associated with the first media content item and the second media content item;
- determining a second plurality of topics associated with the media content presentation session based on distance information for pairs of topics in the first plurality of topics, wherein each of the pairs of topics includes a first topic associated with the first media content item and a second topic associated with the second media content item; and
- transmitting an indication of a plurality of media content items that correspond to at least a portion of the second plurality of topics.

16. The non-transitory computer-readable medium of claim 15, wherein the method further comprises selecting the first media content item and the second media content item from media content search results that are responsive to search terms.

17. The non-transitory computer-readable medium of claim 15, wherein the distance information is a mutual information score.

18. The non-transitory computer-readable medium of claim 15, wherein the given span is two adjacent presentations.

19. The non-transitory computer-readable medium of claim 15, wherein the method further comprises, for each of the first media content item and the second media content item, generating a single rank-ordered list of the second plurality of topics.

20. The non-transitory computer-readable medium of claim 19, wherein the method further comprises, for each of the first media content item and the second media content item, identifying the plurality of media content items as recommended media content items based on the single rank-ordered list.

21. The non-transitory computer-readable medium of claim 20, wherein the single rank-ordered list of the second plurality of topics generated for the first media content item and the second media content item is generated by:
- (a) determining topics associated with the first media content item and the second media content item;
- (b) for each of the topics, obtaining a rank-ordered list of second topics generated for the topic as the first topic; and
- (c) combining all of the rank-ordered lists obtained at (b) together using the distance information as ranking score to form the single rank-ordered list.

* * * * *